US012614978B2

(12) United States Patent
Nguyen et al.

(10) Patent No.: US 12,614,978 B2
(45) Date of Patent: Apr. 28, 2026

(54) CAPACITOR CONVERTER

(71) Applicant: Infineon Technologies Austria AG,
Villach (AT)

(72) Inventors: Trung Nguyen, Fullerton, CA (US);
Matthew Hunter, Torrance, CA (US)

(73) Assignee: Infineon Technologies Austria AG,
Villach (AT)

( * ) Notice: Subject to any disclaimer, the term of this
patent is extended or adjusted under 35
U.S.C. 154(b) by 372 days.

(21) Appl. No.: 18/099,606

(22) Filed: Jan. 20, 2023

(65) Prior Publication Data

US 2024/0250608 A1 Jul. 25, 2024

(51) Int. Cl.
H02M 3/06 (2006.01)
H02M 3/00 (2006.01)
(52) U.S. Cl.
CPC ............. H02M 3/06 (2013.01); H02M 3/015
(2021.05)
(58) Field of Classification Search
CPC .......... H02M 3/00; H02M 3/01; H02M 3/015;
H02M 3/02; H02M 3/04; H02M 3/06;
H02M 3/07; H02M 3/071–078; H02M
3/135; H02M 3/137; H02M 3/142; H02M
3/145; H02M 3/155; H02M 3/156; H02M
3/158; H02M 3/1582; H02M 3/1584;
H02M 3/1588; H02M 1/00; H02M
1/0003; H02M 1/0048; H02M 1/0054;
H02M 1/0058; H02M 1/0083; H02M
1/0085; H02M 1/0095; H02M 1/083;
H02M 1/088; H02M 7/155; H02M 7/162;
H02M 7/19; H02M 7/219; H02M 7/23;
H02M 7/25; H02M 7/4815; H02M
7/4818; H02M 7/483; H02M 7/4833;
H02M 7/4835; H02M 7/4837; H02M
7/487
USPC ......... 363/13–21.3, 40–48, 59–62, 123–127;
323/235, 282, 319, 351
See application file for complete search history.

(56) References Cited

U.S. PATENT DOCUMENTS 10,224,803 B1 3/2019 Rainer
2023/0075326 A1* 3/2023 Zhan ..................... H02M 3/073
2023/0134427 A1* 5/2023 Liu ..................... H02M 1/0043
323/271

FOREIGN PATENT DOCUMENTS

CN 113746326 A 12/2021
EP 3940941 A1 1/2022

OTHER PUBLICATIONS

European Search Report from Corresponding European Patent
Application No. 24152906.4, dated Jun. 7, 2024.

* cited by examiner

*Primary Examiner* — Thienvu V Tran
*Assistant Examiner* — Carlos O Rivera-Perez
(74) *Attorney, Agent, or Firm* — Cooper Legal Group
LLC

(57) ABSTRACT

A converter includes an input terminal, an output terminal,
a rectifier connected between the input terminal and the
output terminal, a first switch, a second switch connected to
the output terminal and connected in series with the first
switch at a first node, and a first leg having a first capacitor
coupled to the first node, and a first isolation switch con-
nected between the first capacitor and the rectifier.

20 Claims, 6 Drawing Sheets

500 —

CONTROL FIRST SWITCH AND SECOND SWITCH CONNECTED BETWEEN INPUT TERMINAL AND OUTPUT TERMINAL AND CONTROL RECTIFIER CONNECTED TO OUTPUT TERMINAL TO GENERATE OUTPUT AT OUTPUT TERMINAL — 502

CONTROL FIRST ISOLATION SWITCH CONNECTED BETWEEN RECTIFIER AND FIRST CAPACITOR OF FIRST LEG CONNECTED TO FIRST NODE TO SET CONVERSION RATIO OF CONVERTER — 504

CAPACITOR CONVERTER

TECHNICAL FIELD

The present disclosure relates generally to voltage converters, and, more particularly, to controlling gain of a capacitor converter.

BACKGROUND

A voltage converter uses switched power storage devices to convert an input voltage to an output voltage. A capacitor converter is a DC to DC converter that uses series connected switches with energy storage devices, including capacitors, connected to nodes between the switches.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to some embodiments, a converter comprises an input terminal, an output terminal, a rectifier connected between the input terminal and the output terminal, a first switch, a second switch connected to the output terminal and connected in series with the first switch at a first node, and a first leg comprising a first capacitor coupled to the first node, and a first isolation switch connected between the first capacitor and the rectifier.

According to some embodiments, a converter comprises an input terminal, an output terminal, a rectifier connected between the input terminal and the output terminal, a first switch, a second switch connected to the output terminal and connected in series with the first switch at a first node, a first resonant leg comprising a first resonant capacitor coupled to the first node and a first isolation switch connected between the first resonant capacitor and a first branch of the rectifier, a third switch connected to the output terminal and connected in series with the second switch at a second node, a flying leg comprising a flying capacitor coupled to the second node and a second isolation switch connected between the flying capacitor and a second branch of the rectifier, a compensation inductor connected between the first resonant leg and the flying leg, and a controller configured to control the first switch, the second switch, the third switch, and the rectifier to generate an output at the output terminal, wherein the controller is configured to control at least one of the first switch, the second switch, the third switch, the first isolation switch, or the second isolation switch to set a conversion ratio of the converter.

According to some embodiments, a system for controlling a converter comprises means for controlling a first switch and a second switch connected in series at a first node and connected between an input terminal and an output terminal and controlling a rectifier connected to the output terminal to generate an output at the output terminal and means for controlling a first isolation switch connected between the rectifier and a first capacitor of a first leg connected to the first node to set a conversion ratio of the converter, wherein the output is a function of the conversion ratio.

According to some embodiments, a method of controlling a converter comprises controlling a first switch and a second switch connected in series at a first node and connected between an input terminal and an output terminal and controlling a rectifier connected to the output terminal to generate an output at the output terminal and controlling a first isolation switch connected between the rectifier and a first capacitor of a first leg connected to the first node to set a conversion ratio of the converter, wherein the output is a function of the conversion ratio.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
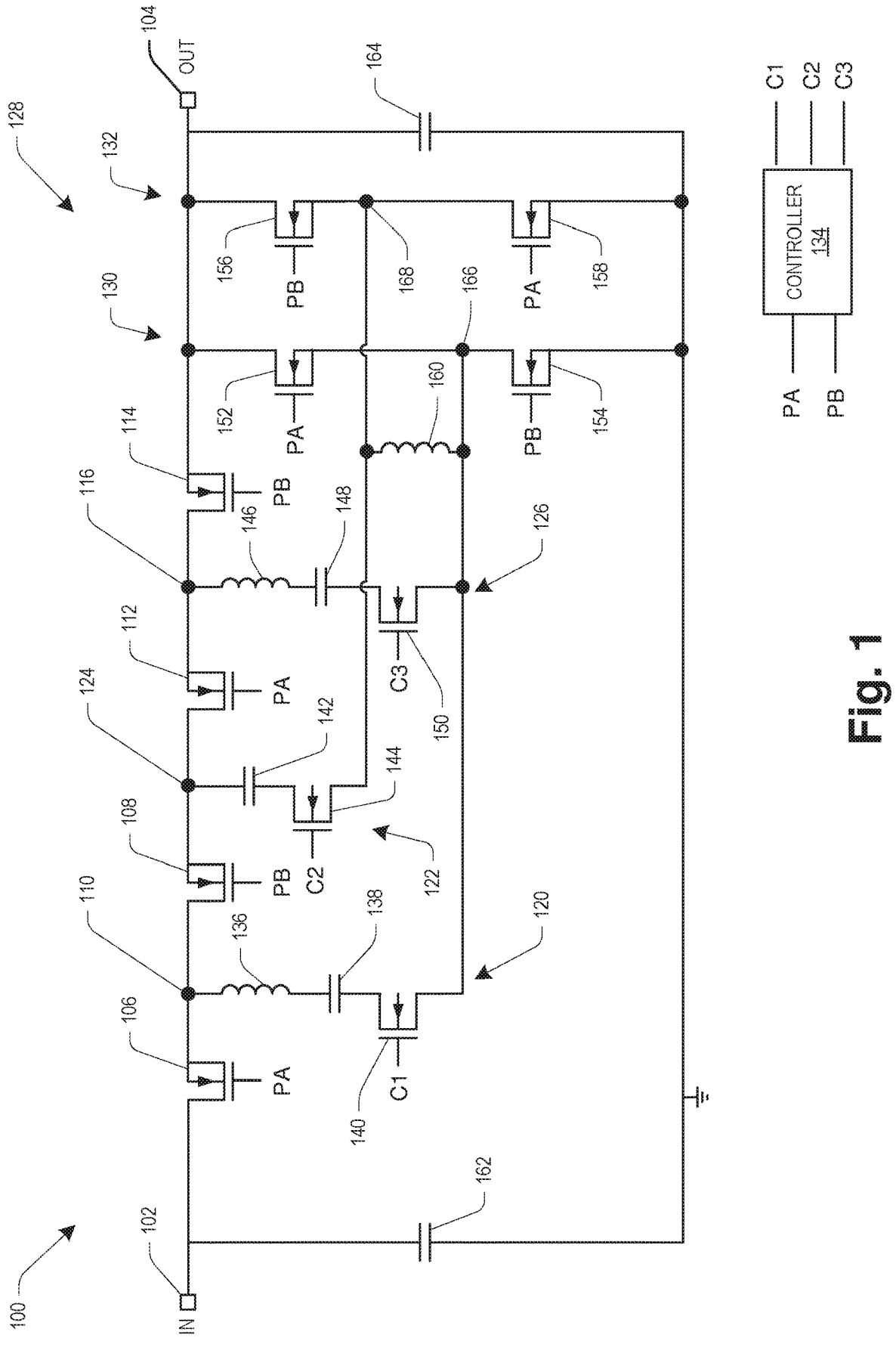
FIGS. 1-4 are schematic diagrams of a converter, according to some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration and is in no way limiting. It is to be understood that other embodiments may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The term "substantially" may be used herein to account for small manufacturing tolerances (e.g., within 5%) that are deemed acceptable in the industry without departing from the aspects of the embodiments described herein.

A converter has switches connected in series between an input terminal and an output terminal. Capacitor legs are connected to nodes between the switches. Isolation switches are provided in at least some of the capacitor legs to allow selected legs to be removed from the converter circuit. Changing the number of active switches and associated capacitor legs changes the gain ratio of the converter. The converter gain ratio may be controlled dynamically, depending on the operating environment or the needs of the load being serviced by the converter.

Referring to FIG. 1 a schematic diagram of a converter 100 is provided, according to some embodiments. The converter 100 includes an input terminal 102, an output terminal 104, a first switch 106 connected to a second switch 108 at a node 110, a third switch 112 connected to a fourth switch 114 at a node 116, a first leg 120 connected to the node 110, a flying leg 122 connected to an intermediate node 124 between the second switch 108 and the third switch 112, a second leg 126 connected to the node 116, a rectifier 128 including a first branch 130 and a second branch 132, and a controller 134. The first leg 120 includes an inductor 136, a capacitor 138, and an isolation switch 140. The flying leg 122 includes a flying capacitor 142 and an isolation switch 144. The second leg 126 includes an inductor 146, a capacitor 148, and an isolation switch 150. The first branch 130 of the rectifier 128 includes half bridge switches 152, 154. The second branch 132 of the rectifier 128 includes half bridge switches 156, 158. A compensation inductor 160 is connected between the first branch 130 and the second branch 132. An input capacitor 162 may be connected to the input terminal 102 and an output capacitor 164 may be connected to the output terminal 104. The converter 100 may be a soft-switching LC resonant converter. It is to be appreciated that while half bride and/or the like is referenced here, this disclosure (including the scope of the claims) is not to be so limited as configurations, arrangements, etc. other than half bride and/or the like are contemplated.

In some embodiments, the inductors 136, 146 are not additional circuit elements, but rather are representative of parasitic inductances within power loops of the converter 100. A first power loop comprises the first switch 106, the first leg 120, the active rectifier half bridge switch 152, 154, and traces connecting the first switch 106, the first leg 120, and the rectifier half bridge switch 152, 154. A second power loop comprises the second switch 108, the second leg 126, the active rectifier half bridge switch 152, 154, and traces connecting the second switch 108, the second leg 126, and the rectifier half bridge switch 152, 154.

In some embodiments, the converter 100 decreases a voltage provided at the input terminal 102 by a configurable gain, such as from a gain of 4:1 to a gain of 1:1. The decreased voltage is provided at the output terminal 104. In some embodiments, a positive gain may be implemented to increase the voltage at the output terminal 104 relative to the voltage at the input terminal 102. In some embodiments, the converter can be bidirectional so that step down and/or step up ratios are possible. The controller 134 generates signals for controlling the converter 100, such as a pulse width modulated (PWM) signal, PA, a PWM signal, PB, that is out of phase with PA, and isolation signals C1, C2, and C3 for controlling the isolation switches 140, 144, 150, respectively. The voltage at the output terminal 104 may be an intermediate voltage, within a system, that may be subsequently stepped down to service a load.

The rectifier 128 provides a rectified voltage to the output terminal 104 and the output capacitor 164. The branches of the rectifier 128 have a half-bridge rectifier topology. The half bridge switches 152, 154 of the first branch 130 are connected at a node 166, and the half bridge switches 156, 158 of the second branch 132 are connected at another node 168. The compensation inductor 160 couples the first leg 120 to the flying leg 122 (also coupling the first branch 130 to the second branch 132 at the respective switching nodes 166, 168). The compensation inductor 160 provides a conduction path that serves to transfer charge to or from the capacitances of the switches 106, 108, 112, 114 such that the voltage across these switches, e.g., the drain-to-source voltage for a field effect transistor (FET), is reduced to zero before a given switch is turned on. In this way, the compensation inductor 160 enables zero voltage switching (ZVS) for each of the switches 106, 108, 112, 114, regardless of whether the legs 120, 126 are matched to a switching frequency of the converter 100. In some embodiments, the compensation inductor 160 is omitted.

The first leg 120 couples the node 110 to the node 166 of the first branch 130. The second leg 126 similarly couples the node 116 to the node 166 of the first branch 130. The number of branches in the rectifier 128 may vary. The flying leg 122 couples the node 124 to the second branch 132 at the node 168. The flying leg 122 may also include a parasitic inductance (not shown).

In some embodiments, the switches 106, 108, 112, 114, 140, 144, 150, 152, 154, 156, 158 in the converter 100 are power metal-oxide semiconductor field-effect transistors (MOSFETs), but other switch types may be used. For example, junction field-effect transistors (JFETs), bipolar junction transistors (BJTs), insulated gate bipolar transistors (IGBTs), high electron mobility transistors (HEMTs), gallium nitride (GaN) transistors, or other types of power transistors may be used in some applications. The switches 106, 108, 112, 114, 140, 144, 150, 152, 154, 156, 158 may be integrated on the same semiconductor die, may each be provided on separate dies, or may otherwise be spread across a plurality of semiconductor dies. Each of the switches 106, 108, 112, 114, 140, 144, 150, 152, 154, 156, 158 has drain and source terminals, as well as a gate terminal that controls conduction between the drain and source.

The controller 134 alternates between setting the first switch 106 to conduct while the second switch 108 is off, and setting the second switch 108 to conduct while the first switch 106 is off. Similarly, the controller alternates the switching of the switches 112, 114. The half bridge switches 152, 154 in the first branch 130 of the rectifier 128 and the half bridge switches 156, 158 in the second branch 132 of the rectifier 128 are also alternated. The switches 106, 112, 152, 158 are partitioned into a group A which may all be switched together, and the switches 108, 114, 154, 156 are partitioned into a group B which may likewise be switched together. The controller 134 generates the PA and PB PWM signals to control the groups. In some embodiments, the controller 134 generates separate control signals for each of the switches 106, 108, 112, 114, 152, 154, 156, 158 rather than providing common control signals for the two switch groups.

Waveforms for the PA and PB signals are symmetric, i.e., have the same positive pulse intervals, such that each control signal PA, PB, has a duty cycle of approximately 50%. There is a dead time between pulses of the control signals PA, PB for each switch cycle of the converter 100 so there will be brief intervals during which none of the switches 106, 108, 112, 114, 152, 154, 156, 158 are conducting. The controller 134 generates the control signals PA, PB at a switching frequency, FSW. For optimal efficiency, the resonant frequencies corresponding to the inductance and capacitance of the legs 120, 126 should match the switching frequency, FSW, with a small adjustment to account for the dead time intervals.

The controller 134 may be implemented using a combination of analog hardware components (such as transistors, amplifiers, diodes, and resistors), and processor circuitry that includes primarily digital components. The processor circuitry may include one or more of a digital signal processor (DSP), a general-purpose processor, and an application-specific integrated circuit (ASIC). The controller 134 may also include memory, e.g., non-volatile memory such as flash, that includes instructions or data for use by the processor circuitry, and one or more timers, e.g., for providing the switch intervals according to the switching frequency and dead time intervals.

FIGS. 1-4 are schematic diagrams of the converter 100 configured with different gains, according to some embodiments. The gain of the converter may be dynamically controlled by the controller 134, based on user input, system requirements, load requirements, or some other consideration. In FIG. 1, the gain between the voltage at the input terminal 102 and the voltage at the output terminal 104 is 4:1, due to the four switches 106, 108, 112, 114 in series. The isolation switches 140, 144, 150 are closed by the controller 134 by asserting the control signals C1, C2, C3. Other conversion ratios, such as 5:1, 6:1, or any other ratio, may be provided by adding additional resonant legs, and such is contemplated herein.

Figure 2:
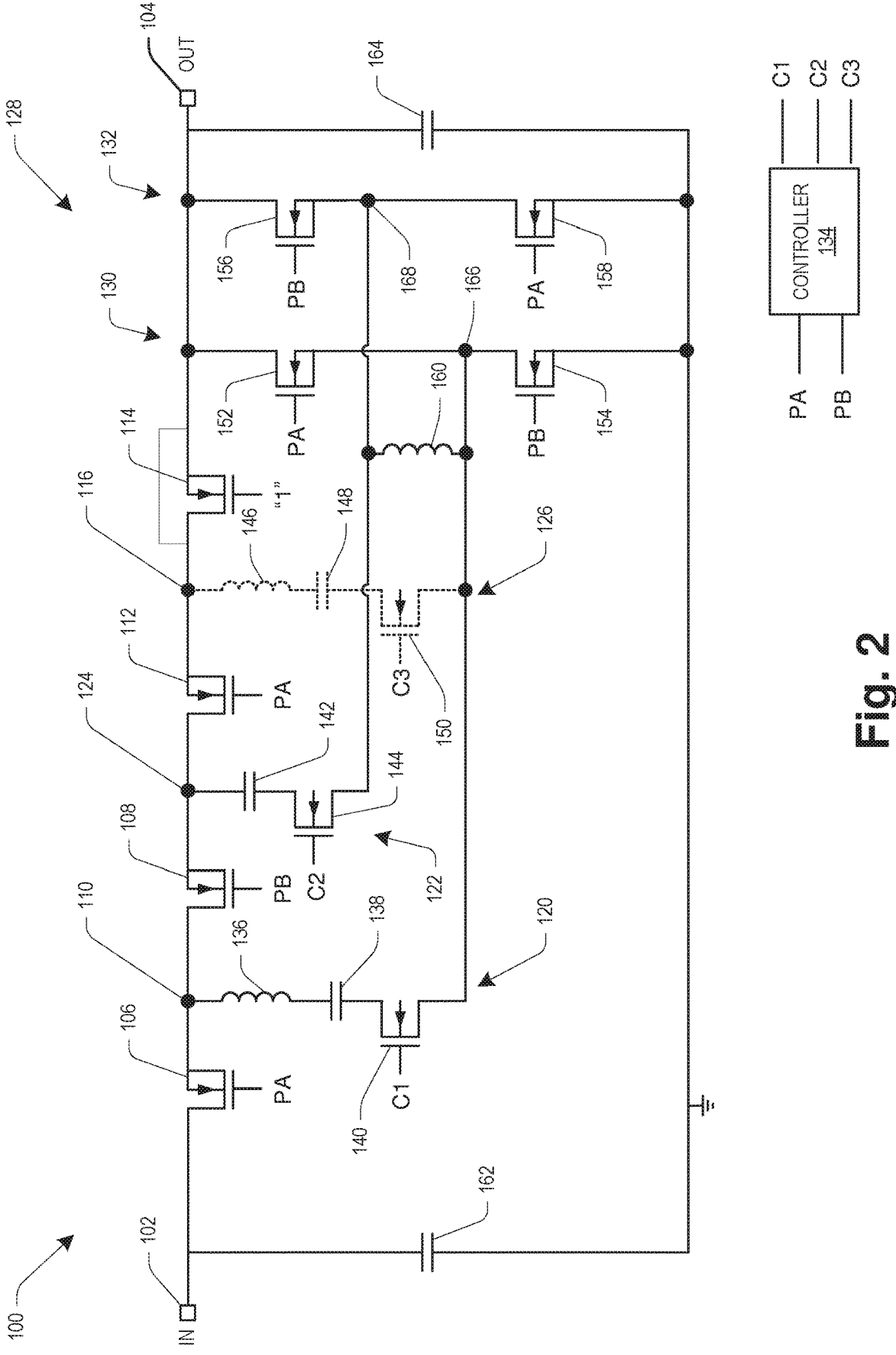

Referring to FIG. 2, the converter 100 is configured to have a gain of 3:1. To facilitate the change in gain, the controller 134 opens the isolation switch 150 by de-asserting C3 (logic "0") to remove the leg 126 from the converter 100 and provides a logic "1" signal to the switch 114, causing the switch 114 to stay closed instead of switching according to the PB signal. This always-on condition is represented as a short across the switch 114.

Figure 3:
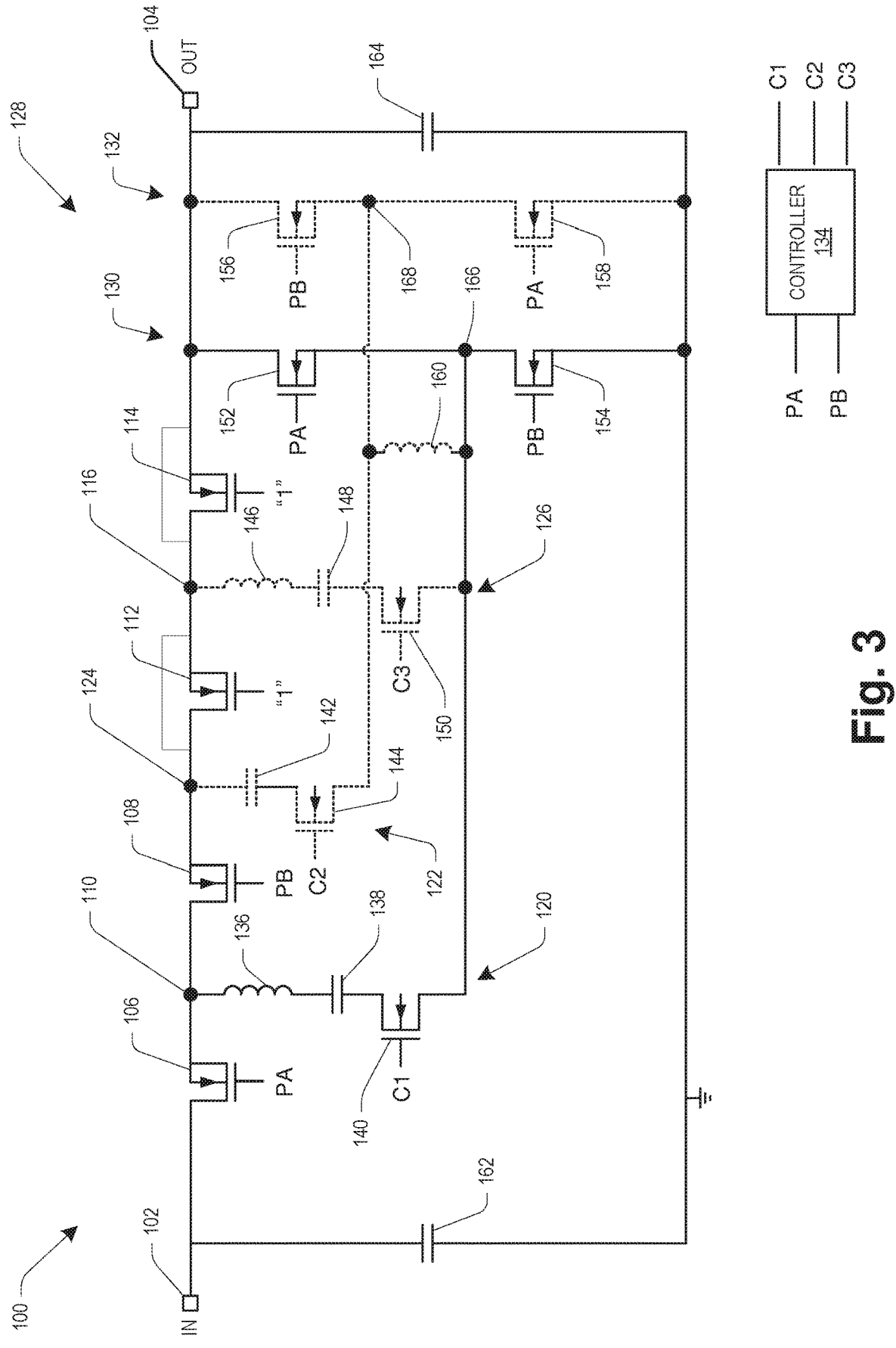

Referring to FIG. 3, the converter 100 is configured to have a gain of 2:1. To facilitate the change in gain, the controller 134 opens the isolation switch 150 by de-asserting C3 to remove the leg 126 from the converter 100 and opens the isolation switch 144 by de-asserting C2 to remove the flying leg 122 and the compensation inductor 160 from the converter 100. The controller 134 provides a logic "1" signal to the switch 112 and the switch 114, causing the switches 112, 114 to stay closed instead of switching according to the PA and PB signals, respectively. This always-on condition is represented as shorts across the switches 112, 114. Since the flying leg 122 is isolated, the controller 134 opens the half bridge switches 156, 158 in the second branch 132 of the rectifier 128.

Figure 4:
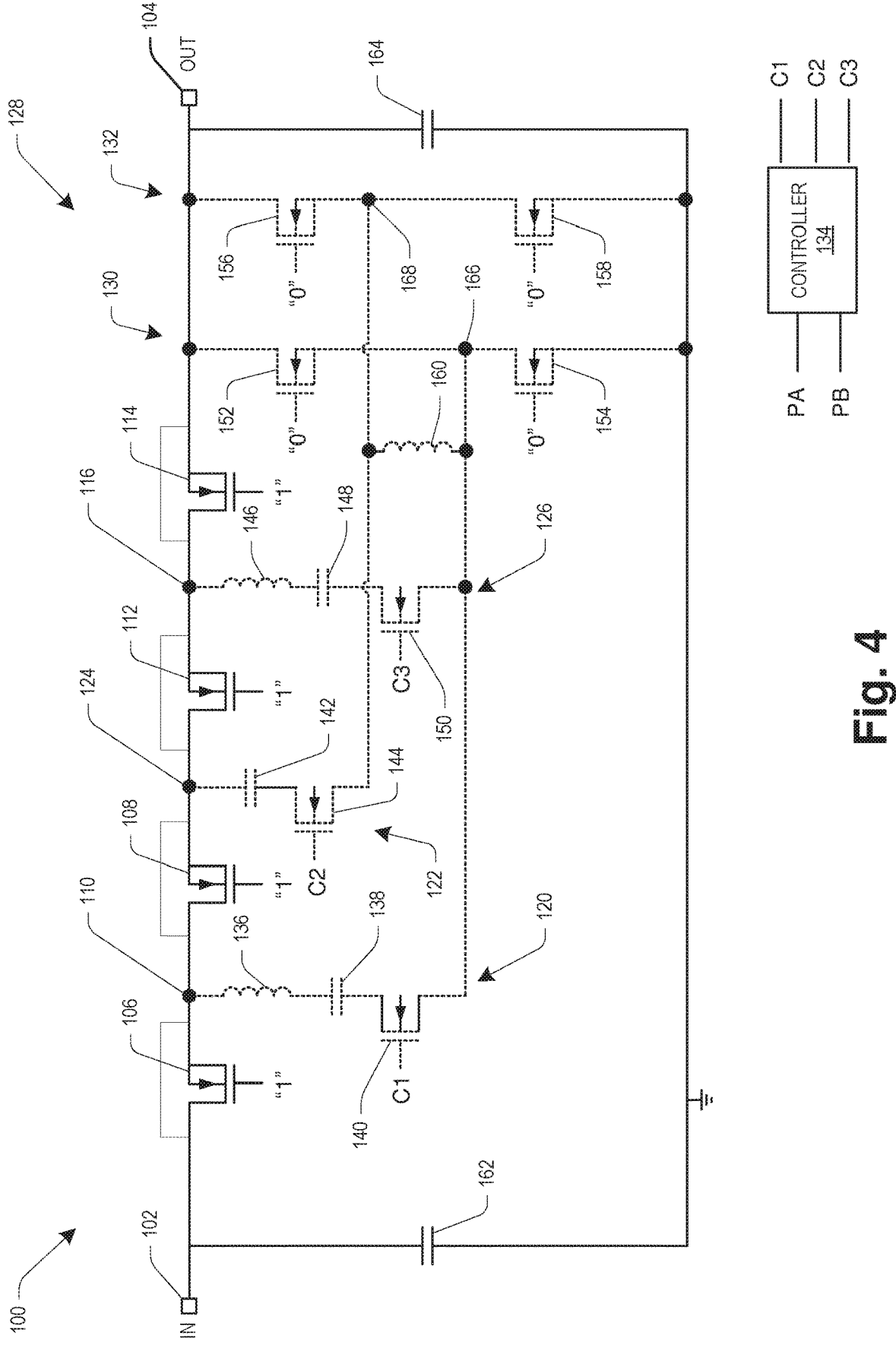

Referring to FIG. 4, the converter 100 is configured to have a gain of 1:1. To facilitate the change in gain, the controller 134 opens the isolation switch 150 by de-asserting C3 to remove the leg 126 from the converter 100, opens the isolation switch 144 by de-asserting C2 to remove the flying leg 122 and the compensation inductor 160 from the converter 100, and opens the isolation switch 140 by de-asserting C1. The controller 134 provides a logic "1" signal to the switches 106, 108, 112, 114, causing the switches 106, 108, 112, 114 to stay closed instead of switching according to the PA and PB signals, respectively. This always-on condition is represented as shorts across the switches 106, 108, 112, 114. The controller 134 opens the half bridge switches 152, 154, 156, 158 in the rectifier 128.

Some of the disclosed techniques may be readily implemented in software using object or object-oriented software development environments that provide portable source code that can be used on a variety of computer or workstation platforms. Alternatively, the disclosed techniques and/or arrangements may be implemented partially or fully in hardware using standard logic circuits or VLSI design.

Moreover, the disclosed procedures may be readily implemented in software that can be stored on a computer-readable storage medium (such as a memory storage device), executed on programmed general-purpose computer with the cooperation of a controller and memory, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

Figure 5:
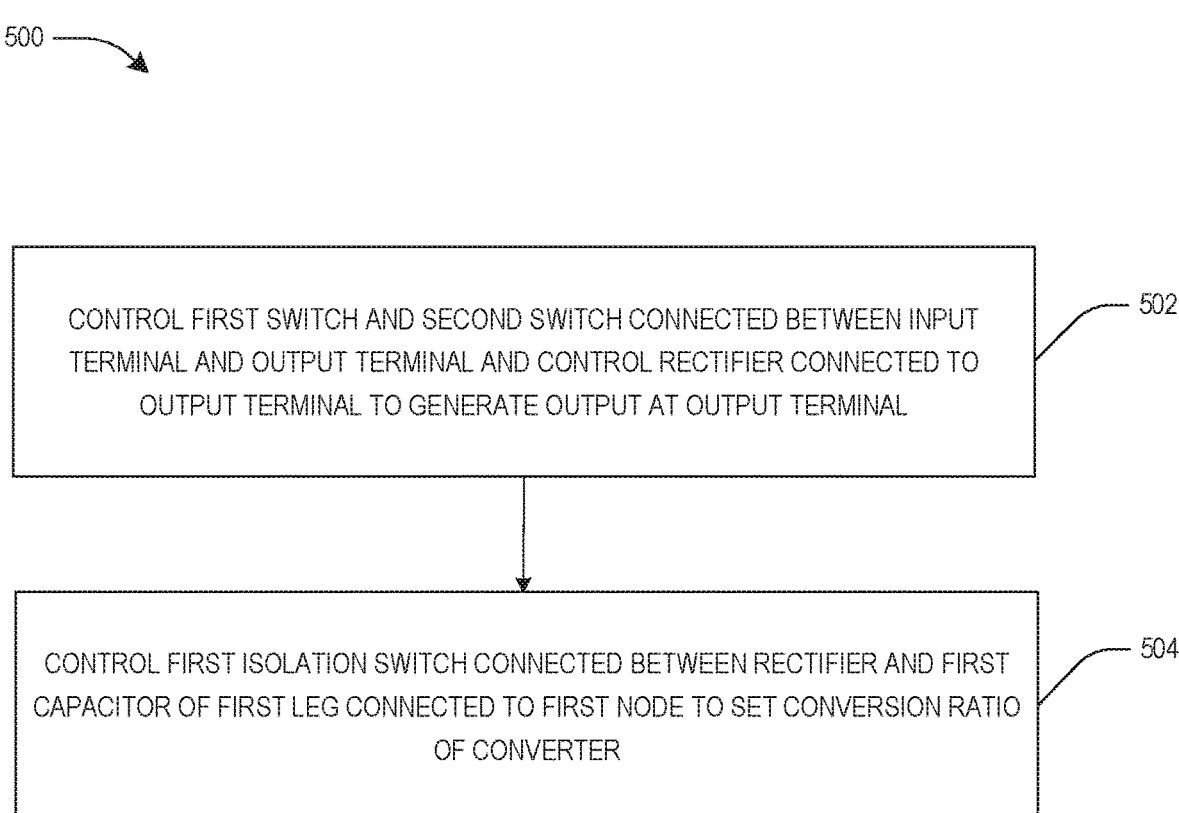
FIG. 5 illustrates a method of driving a transistor gate, according to some embodiments.

Referring to FIG. 5, a flow diagram of a method 500 for controlling a converter 100 is provided, according to some embodiments. At 502 a first switch 106 and a second switch 108 connected in series at a first node 110 and connected between an input terminal 102 and an output terminal 104 and a rectifier 128 connected to the output terminal 104 are controlled to generate an output at the output terminal 104. At 504, a first isolation switch 140 connected between the rectifier 128 and a first capacitor 138 of a first leg 120 connected to the first node 110 is controlled to set a conversion ratio of the converter 100. The output is a function of the conversion ratio.

Figure 6:
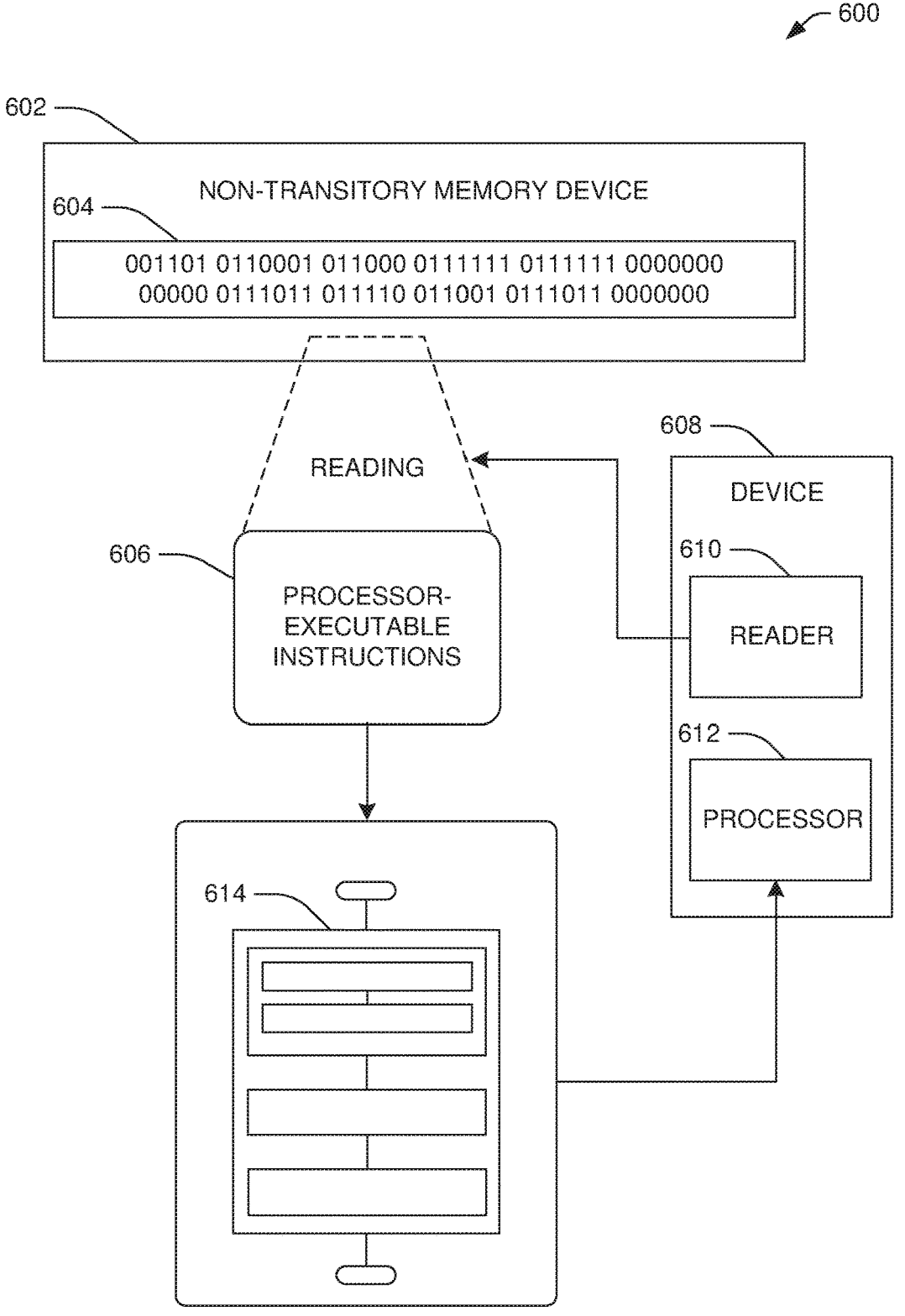
FIG. 6 illustrates an exemplary computer-readable medium, according to some embodiments.

FIG. 6 illustrates an exemplary embodiment 600 of a computer-readable medium 602, according to some embodiments. One or more embodiments involve a computer-readable medium comprising processor-executable instructions configured to implement one or more of the techniques presented herein. The embodiment 600 comprises a non-transitory computer-readable medium 602 (e.g., a CD-R, DVD-R, flash drive, a platter of a hard disk drive, etc.), on which is encoded computer-readable data 604. This computer-readable data 604 in turn comprises a set of processor-executable computer instructions 606 that, when executed by a computing device 608 including a reader 610 for reading the processor-executable computer instructions 606 and a processor 612 for executing the processor-executable computer instructions 606, are configured to facilitate operations according to one or more of the principles set forth herein. In some embodiments, the processor-executable computer instructions 606, when executed, are configured to facilitate performance of a method 614, such as at least some of the aforementioned method(s). In some embodiments, the processor-executable computer instructions 606, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

Providing the converter 100 with the capability of dynamically changing the gain allows the converter 100 to be used in a wide variety of applications. In a charging environment, a higher voltage allows faster charging without increasing current. Slower charging may be provided using a different gain, for example during the latter portion of the charging cycle, or for charging devices not compatible with fast charging. As battery performance drops over the life cycle of the battery, the charging voltage may be changed by configuring the gain to maintain peak power performance. The converter 100 facilitates omission of a transformer or inductor on the output to scale the voltage, thereby reducing the system footprint and cost.

According to some embodiments, a converter comprises an input terminal, an output terminal, a rectifier connected between the input terminal and the output terminal, a first switch, a second switch connected to the output terminal and connected in series with the first switch at a first node, and a first leg comprising a first capacitor coupled to the first node, and a first isolation switch connected between the first capacitor and the rectifier.

According to some embodiments, the converter comprises a controller configured to control the first switch and the second switch to generate an output at the output terminal according to a first conversion ratio, wherein the controller is configured to control the first isolation switch to generate the output according to a second conversion ratio different than the first conversion ratio.

According to some embodiments, the first leg has a first inductance, a capacitance of the first capacitor is determined such that a switch frequency used by the controller to control the first switch and the second switch is a resonant frequency of the first capacitor and the first inductance, the first inductance comprises parasitic inductances within a first power loop connecting the input terminal to the output terminal, and the first power loop comprises the first switch, the first leg, a rectifier switch in the rectifier, and traces connecting the first switch, the first leg, and the rectifier switch.

According to some embodiments, the converter comprises a third switch connected to the output terminal and connected in series with the second switch at a second node, and a second leg comprises a second capacitor coupled to the second node, and a second isolation switch connected between the second capacitor and the rectifier.

According to some embodiments, the first isolation switch connects the first leg to a first branch of the rectifier, and the second isolation switch connects the second leg to a second branch of the rectifier.

According to some embodiments, the converter comprises a compensation inductor connected between the first leg and the second leg.

According to some embodiments, the converter comprises a third switch connected in series with the second switch at a second node, a flying leg comprises a flying capacitor coupled to the second node, and a second isolation switch connected between the flying capacitor and the rectifier, a fourth switch connected to the output terminal and connected in series with the third switch at a third node, and a second leg comprises a second capacitor coupled to the third node, and a third isolation switch connected between the second capacitor and the rectifier.

According to some embodiments, the first isolation switch connects the first leg to a first branch of the rectifier, the second isolation switch connects the flying leg to a second branch of the rectifier, and the third isolation switch connects the second leg to the first branch of the rectifier.

According to some embodiments, the converter comprises a compensation inductor connected between the first leg and the second leg.

According to some embodiments, a converter comprises an input terminal, an output terminal, a rectifier connected between the input terminal and the output terminal, a first switch, a second switch connected to the output terminal and connected in series with the first switch at a first node, a first resonant leg comprising a first resonant capacitor coupled to the first node and a first isolation switch connected between the first resonant capacitor and a first branch of the rectifier, a third switch connected to the output terminal and connected in series with the second switch at a second node, a flying leg comprising a flying capacitor coupled to the second node and a second isolation switch connected between the flying capacitor and a second branch of the rectifier, a compensation inductor connected between the first resonant leg and the flying leg, and a controller configured to control the first switch, the second switch, the third switch, and the rectifier to generate an output at the output terminal, wherein the controller is configured to control at least one of the first switch, the second switch, the third switch, the first isolation switch, or the second isolation switch to set a conversion ratio of the converter.

According to some embodiments, the controller is configured to close the first isolation switch and the second isolation switch to set the conversion ratio to 3:1, the controller is configured to close the first isolation switch, open the second isolation switch, and close the third switch to set the conversion ratio to 2:1, and the controller is configured to open the first isolation switch and the second isolation switch, and close the first switch, the second switch, and the third switch to set the conversion ratio to 1:1.

According to some embodiments, the converter comprises a fourth switch connected to the output terminal and connected in series with the third switch at a third node and a second resonant leg comprises a second resonant capacitor coupled to the third node and a third isolation switch connected between the second resonant capacitor and the first branch of the rectifier, wherein the controller is configured to control the first switch, the second switch, the third switch, the fourth switch, and the rectifier to generate the output at the output terminal, and the controller is configured to control at least one of the first switch, the second switch, the third switch, the fourth switch, the first isolation switch, the second isolation switch, or the third isolation switch to set the conversion ratio of the converter.

According to some embodiments, the controller is configured to close the first isolation switch, the second isolation switch, and the third isolation switch to set the conversion ratio to 4:1, the controller is configured to close the first isolation switch and the second isolation switch, open the third isolation switch, and close the fourth switch to set the conversion ratio to 3:1, the controller is configured to close the first isolation switch, open the second isolation switch and the third isolation switch, and close the third switch and the fourth switch to set the conversion ratio to 2:1, and the controller is configured to open the first isolation switch, the second isolation switch, and the third isolation switch, and close the first switch, the second switch, the third switch, and the fourth switch to set the conversion ratio to 1:1.

According to some embodiments, a method of controlling a converter comprises controlling a first switch and a second switch connected in series at a first node and connected between an input terminal and an output terminal and controlling a rectifier connected to the output terminal to generate an output at the output terminal and controlling a first isolation switch connected between the rectifier and a first capacitor of a first leg connected to the first node to set a conversion ratio of the converter, wherein the output is a function of the conversion ratio.

According to some embodiments, the method comprises controlling the first switch, the second switch, and a third switch connected in series with the second switch at a second node to generate the output at the output terminal and controlling the first isolation switch and a second isolation switch connected between the rectifier and a second capacitor of a second leg connected to the second node to set the conversion ratio of the converter.

According to some embodiments, controlling the first isolation switch comprises controlling the first isolation switch to connect the first leg to a first branch of the rectifier that is connected to a compensation inductor and controlling the second isolation switch comprises controlling the second isolation switch to connect the second leg to a second branch of the rectifier that is connected to the compensation inductor.

According to some embodiments, the method comprises closing the first isolation switch and the second isolation switch to set the conversion ratio to 3:1, closing the first isolation switch, opening the second isolation switch, and closing the third switch to set the conversion ratio to 2:1, and opening the first isolation switch and the second isolation switch, and closing the first switch, the second switch, and the third switch to set the conversion ratio to 1:1.

According to some embodiments, the method comprises controlling the first switch, the second switch, the third switch, and a fourth switch connected in series with the third switch at a third node to generate the output at the output terminal and controlling the first isolation switch, the second isolation switch, and a third isolation switch connected between the rectifier and a third capacitor of a third leg connected to the third node to set the conversion ratio of the converter.

According to some embodiments, the method comprises closing the first isolation switch, the second isolation switch, and the third isolation switch to set the conversion ratio to 4:1, closing the first isolation switch and the second isolation switch, opening the third isolation switch, and closing the fourth switch to set the conversion ratio to 3:1, closing the first isolation switch, opening the second isolation switch and the third isolation switch, and closing the third switch and the fourth switch to set the conversion ratio to 2:1, and opening the first isolation switch, the second isolation switch, and the third isolation switch, and closing the first switch, the second switch, the third switch, and the fourth switch to set the conversion ratio to 1:1.

According to some embodiments, controlling the first isolation switch comprises controlling the first isolation switch to connect the first leg to a first branch of the rectifier that is connected to a compensation inductor, controlling the second isolation switch comprises controlling the second isolation switch to connect the second leg to a second branch of the rectifier that is connected to the compensation inductor, and controlling the third isolation switch comprises controlling the third isolation switch to connect the third leg to the first branch of the rectifier.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally to be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A converter, comprising:
an input terminal;
an output terminal;
a rectifier connected between the input terminal and the output terminal;
a first switch;
a second switch connected to the output terminal and connected in series with the first switch at a first node;
a third switch connected to the output terminal and connected in series with the second switch at a second node;
a first leg comprising:
a first capacitor coupled to the first node; and
a first isolation switch connected between the first capacitor and the rectifier;
a second leg comprising:
a second capacitor coupled to the second node; and
a second isolation switch connected between the second capacitor and the rectifier; and
a controller configured to:
in a first mode, control switching of the first switch, the second switch, and the third switch to generate an output at the output terminal; and
in a second mode, open the second isolation switch, control the third switch in an always-on condition, and control switching of the first switch and the second switch to generate the output at the output terminal.

2. The converter of claim 1, wherein:
the controller is configured to:
generate the output according to a first conversion ratio in the first mode; and
generate the output according to a second conversion ratio different than the first conversion ratio in the second mode.

3. The converter of claim 1, wherein:
the first leg has a first inductance;
a capacitance of the first capacitor is determined such that a switch frequency used by the controller to control the first switch and the second switch is a resonant frequency of the first capacitor and the first inductance;
the first inductance comprises parasitic inductances within a first power loop connecting the input terminal to the output terminal; and
the first power loop comprises the first switch, the first leg, a rectifier switch in the rectifier, and traces connecting the first switch, the first leg, and the rectifier switch.

4. The converter of claim 1, wherein:
the first isolation switch connects the first leg to a first branch of the rectifier; and
the second isolation switch connects the second leg to a second branch of the rectifier.

5. The converter of claim 1, comprising:
a compensation inductor connected between the first leg and the second leg.

6. The converter of claim 1, comprising:
a fourth switch connected in series with the second switch at a third node between the first node and the second node;
a flying leg comprising:
a flying capacitor coupled to the third node; and
a third isolation switch connected between the flying capacitor and the rectifier.

7. The converter of claim 6, wherein:
the first isolation switch connects the first leg to a first branch of the rectifier;
the third isolation switch connects the flying leg to a second branch of the rectifier; and
the second isolation switch connects the second leg to the first branch of the rectifier.

8. The converter of claim 6, comprising:
a compensation inductor connected between the first leg and the flying leg.

9. The converter of claim 6, wherein:
the controller is configured to:
in the first mode, control switching of the fourth switch to generate the output at the output terminal;
in the second mode, control switching of the fourth switch to generate the output at the output terminal;
in a third mode, open the third isolation switch, control the third switch and the fourth switch in an always-on condition, and control switching of the first switch and the second switch to generate the output at the output terminal.

10. A converter, comprising:
an input terminal;
an output terminal;
a rectifier connected between the input terminal and the output terminal;
a first switch;
a second switch connected to the output terminal and connected in series with the first switch at a first node;
a first resonant leg comprising:
a first resonant capacitor coupled to the first node; and
a first isolation switch connected between the first resonant capacitor and a first branch of the rectifier;
a third switch connected to the output terminal and connected in series with the second switch at a second node;
a flying leg comprising:
a flying capacitor coupled to the second node; and
a second isolation switch connected between the flying capacitor and a second branch of the rectifier;
a compensation inductor connected between the first resonant leg and the flying leg; and
a controller configured to control the first switch, the second switch, the third switch, and the rectifier to generate an output at the output terminal, wherein:
the controller is configured to:
in a first mode, control switching of the first switch, the second switch, and the third switch to generate an output at the output terminal; and
in a second mode, open the second isolation switch, control the third switch in an always-on condition, and control switching of the first switch and the second switch to generate the output at the output terminal.

11. The converter of claim 10, wherein:
the controller is configured to close the first isolation switch and the second isolation switch to set the conversion ratio to 3:1;
the controller is configured to close the first isolation switch, open the second isolation switch, and control the third switch in an always on condition to set the conversion ratio to 2:1; and
the controller is configured to open the first isolation switch and the second isolation switch, and control the first switch, the second switch, and the third switch in an always on condition to set the conversion ratio to 1:1.

12. The converter of claim 11, comprising:

a fourth switch connected to the output terminal and connected in series with the third switch at a third node; and a second resonant leg comprising:

a second resonant capacitor coupled to the third node; and a third isolation switch connected between the second resonant capacitor and the first branch of the rectifier; wherein:

the controller is configured to control the first switch, the second switch, the third switch, the fourth switch, and the rectifier to generate the output at the output terminal; and the controller is configured to control at least one of the first switch, the second switch, the third switch, the fourth switch, the first isolation switch, the second isolation switch, or the third isolation switch to set the conversion ratio of the converter, wherein at least one of the second switch, the third switch, or the fourth switch is controlled in an always on condition and the first switch is controlled according to a switching signal to reduce the conversion ratio.

13. The converter of claim 12, wherein:

the controller is configured to close the first isolation switch, the second isolation switch, and the third isolation switch to set the conversion ratio to 4:1;

the controller is configured to close the first isolation switch and the second isolation switch, open the third isolation switch, and control the fourth switch in an always on condition to set the conversion ratio to 3:1;

the controller is configured to close the first isolation switch, open the second isolation switch and the third isolation switch, and control the third switch and the fourth switch in an always on condition to set the conversion ratio to 2:1; and the controller is configured to open the first isolation switch, the second isolation switch, and the third isolation switch, and control the first switch, the second switch, the third switch, and the fourth switch in an always on condition to set the conversion ratio to 1:1.

14. A method of controlling a converter, comprising:

controlling a first switch, a second switch connected in series at a first node and connected between an input terminal and an output terminal, and a third switch connected to the output terminal and connected in series with the second switch at a second node and controlling a rectifier connected to the output terminal to generate an output at the output terminal; and controlling a first isolation switch connected between the rectifier and a first capacitor of a first leg connected to the first node and a second isolation switch connected between the rectifier and a second capacitor of a second leg connected to the second node to set a conversion ratio of the converter, wherein:

controlling the first switch, the second switch, and the third switch comprises:

in a first mode, controlling switching of the first switch, the second switch, and the third switch to generate an output at the output terminal; and in a second mode, opening the second isolation switch, controlling the third switch in an always-on condition, and controlling switching of the first switch and the second switch to generate the output at the output terminal.

15. The method of claim 14, wherein:

controlling the first isolation switch comprises controlling the first isolation switch to connect the first leg to a first branch of the rectifier that is connected to a compensation inductor; and controlling the second isolation switch comprises controlling the second isolation switch to connect the second leg to a second branch of the rectifier that is connected to the compensation inductor.

16. The method of claim 15, comprising:

closing the first isolation switch and the second isolation switch to set the conversion ratio to 3:1;

closing the first isolation switch, opening the second isolation switch, and controlling the third switch in an always on condition to set the conversion ratio to 2:1; and opening the first isolation switch and the second isolation switch, and controlling the first switch, the second switch, and the third switch in an always on condition to set the conversion ratio to 1:1.

17. The method of claim 14, comprising:

controlling the first switch, the second switch, the third switch, and a fourth switch connected in series with the third switch at a third node to generate the output at the output terminal; and controlling the first isolation switch, the second isolation switch, and a third isolation switch connected between the rectifier and a third capacitor of a third leg connected to the third node to set the conversion ratio of the converter, wherein at least one of the second switch, the third switch, or the fourth switch is controlled in an always on condition and the first switch is controlled according to a switching signal to reduce the conversion ratio.

18. The method of claim 17, comprising:

closing the first isolation switch, the second isolation switch, and the third isolation switch to set the conversion ratio to 4:1;

closing the first isolation switch and the second isolation switch, opening the third isolation switch, and controlling the fourth switch in an always on condition to set the conversion ratio to 3:1;

closing the first isolation switch, opening the second isolation switch and the third isolation switch, and controlling the third switch and the fourth switch in an always on condition to set the conversion ratio to 2:1; and opening the first isolation switch, the second isolation switch, and the third isolation switch, and controlling the first switch, the second switch, the third switch, and the fourth switch in an always on condition to set the conversion ratio to 1:1.

19. The method of claim 17, wherein:

controlling the first isolation switch comprises controlling the first isolation switch to connect the first leg to a first branch of the rectifier that is connected to a compensation inductor;

controlling the second isolation switch comprises controlling the second isolation switch to connect the second leg to a second branch of the rectifier that is connected to the compensation inductor; and controlling the third isolation switch comprises controlling the third isolation switch to connect the third leg to the first branch of the rectifier.

20. The method of claim 14, comprising:

controlling the first switch, the second switch, the third switch, and a fourth switch connected in series between the second switch and the third switch at a third node between the first node and the second node to generate the output at the output terminal; and controlling the first isolation switch, the second isolation switch, and a third isolation switch connected between the rectifier and a flying capacitor of a flying leg 5 connected to the third node to set the conversion ratio of the converter, wherein:

to reduce the conversion ratio, at least one of the second switch, the third switch, or the fourth switch is controlled in an always on condition and the first 10 switch is controlled according to a switching signal.

* * * * *